US009512827B2

(12) United States Patent
Yeomans

(10) Patent No.: US 9,512,827 B2
(45) Date of Patent: Dec. 6, 2016

(54) STEAM OR VAPOUR CONDENSING SYSTEM

(76) Inventor: Allan James Yeomans, Gold Coast (AU)

( * ) Notice: Subject to any disclaimer, the term of this patent is extended or adjusted under 35 U.S.C. 154(b) by 202 days.

(21) Appl. No.: 14/241,162

(22) PCT Filed: Sep. 5, 2012

(86) PCT No.: PCT/AU2012/001046
§ 371 (c)(1),
(2), (4) Date: Mar. 5, 2014

(87) PCT Pub. No.: WO2013/033762
PCT Pub. Date: Mar. 14, 2013

(65) Prior Publication Data
US 2014/0208746 A1   Jul. 31, 2014

(30) Foreign Application Priority Data

Sep. 6, 2011 (AU) ................................ 2011903603

(51) Int. Cl.
| | |
|---|---|
| *F03G 6/06* | (2006.01) |
| *F24J 2/34* | (2006.01) |
| *F24J 2/52* | (2006.01) |
| *F24J 2/42* | (2006.01) |
| *F24J 2/10* | (2006.01) |

(52) U.S. Cl.
CPC .................. *F03G 6/06* (2013.01); *F03G 6/065* (2013.01); *F03G 6/067* (2013.01); *F24J 2/10* (2013.01); *F24J 2/345* (2013.01); *F24J 2/42* (2013.01); *F24J 2/5267* (2013.01); *Y02E 10/46* (2013.01)

(58) Field of Classification Search
CPC .......... Y02E 10/44; Y02E 10/46; F03G 6/065; F03G 6/067; F24J 2/5267
See application file for complete search history.

(56) References Cited

U.S. PATENT DOCUMENTS

| | | | |
|---|---|---|---|
| 4,081,966 A | * | 4/1978 | deGeus ................... F03G 6/065 126/636 |
| 4,377,071 A | | 3/1983 | Assaf et al. |
| 4,387,574 A | | 6/1983 | Becker et al. |

(Continued)

FOREIGN PATENT DOCUMENTS

WO       81/00596 A1    3/1981

OTHER PUBLICATIONS

International Search Report and Written Opinion dated Oct. 26, 2012.

*Primary Examiner* — Thomas Denion
*Assistant Examiner* — Mickey France
(74) *Attorney, Agent, or Firm* — Wood, Phillips, Katz, Clark & Mortimer

(57) ABSTRACT

A steam or vapor condensing system (10) for use with radiant solar energy collecting apparatus (17) of the type having solar energy concentrators (20) and in which steam or vapor is generated for supply to a load such as to a steam turbine, the system (10) using the solar energy concentrators (20) to directly or indirectly radiate heat energy of exhaust steam or vapor from the load. The collecting apparatus (17) may float on a body of liquid (19) and heat energy of the exhaust steam or vapor is transferred to the body of liquid for example by being passed through a duct (23) in the body of liquid (19) and heat energy transferred to the body of liquid (19) is radiated by the concentrators (20).

12 Claims, 3 Drawing Sheets

(56) References Cited

U.S. PATENT DOCUMENTS

| | | | |
|---|---|---|---|
| 4,454,865 A | 6/1984 | Tammen | |
| 4,490,981 A * | 1/1985 | Meckler | F03G 6/001 126/600 |
| 5,309,893 A * | 5/1994 | Yeomans | F24J 2/10 126/565 |
| 6,220,241 B1 * | 4/2001 | Yeomans | F24J 2/07 126/565 |
| 2009/0126364 A1 * | 5/2009 | Mills | F01K 9/003 60/641.8 |
| 2010/0059046 A1 | 3/2010 | Hinderling | |

* cited by examiner

STEAM OR VAPOUR CONDENSING SYSTEM

TECHNICAL FIELD

This invention relates to a steam or vapour condensing system and in particular to a method and apparatus for condensing steam or vapour exhausted from a steam or vapour engine which is supplied with steam or vapour from solar energy collecting apparatus. The steam or vapour condensing method and apparatus of the invention has particular but not exclusive application to solar thermal energy generating systems having solar collectors which float on a body of liquid.

BACKGROUND ART

Radiant solar energy collecting apparatus in which solar energy is collected and concentrated on a solar energy receiver are well known. Such apparatus is used for electric power production for example in solar thermal power stations where a liquid or gas heated by solar energy is converted into steam or a vapour which is used for generating usable energy. The solar energy concentrators for use in such apparatus may be of various designs. For example, concentrators may be of a parabolic trough or dish design in which a curved parabolic trough or dish concentrates received solar radiation onto an absorber or receiver typically in the form of a pipe or other target containing a heat transfer working fluid. The parabolic trough concentrators may also be of a composite form and comprise for example a plurality of reflectors which may be planar or of a curved configuration. The heat transfer working fluid passes through the absorber or receiver and is heated or superheated and used to drive an engine or turbine. For example, where the working fluid is water, water is converted into superheated steam which may be supplied to a steam turbine. To enable sufficient power to be generated, a solar thermal power station may have many parabolic troughs or dishes occupying a large area of land.

In other systems known as heliostats, a central tower carries a target through which the working fluid flows and a series of flat mirrors which are mounted to track movement of the sun are provided to focus the sun's rays on the target on the tower to heat the working fluid which may then be used for driving an engine.

In my International patent application No PCT/AU99/00140, I disclose radiant energy collecting apparatus which includes a platform assembly floating on a body of liquid typically water usually contained in a reservoir. Reflectors of a solar concentrator in a Fresnel configuration are supported on the top side of the platform assembly to concentrate solar energy onto a secondary concentrator which concentrates the energy on a solar energy receiver usually comprising tubes through which a heat transfer fluid flows. The heat transfer fluid may be water which is converted into steam when the receiver is exposed to the concentrated solar energy and the steam superheated for supply to a steam turbine which can drive an electrical generator for the supply of power. For efficiency of operation, it is preferred that exhaust steam from the steam turbine be condensed into water and the water then reused as the working fluid in the system.

Various different designs of condenser are currently used for condensing steam into water including water cooled condensers and air cooled condensers. A particular disadvantage of water cooled condensers is that it is necessary to have a supply of water for cooling the condenser and absorb the heat of the steam. Further water cooled condensers tend to be of a relatively complex construction. Where water is required for use in a steam condenser, a design which requires water for condensation or cooling may conflict with the location of solar thermal plants. For example, such plants are often located in remote areas such as desert areas where although high solar radiation is available, there may be limited water resources. Thus the most efficient location for such a plant may be affected by difficulty in obtaining an adequate water supply. Some authorities also prohibit the use of potable water for such applications.

Water usage may be reduced by using air cooled condensers to convert the steam back into water. Air-cooling of fluids has assumed an increasing importance as compared to conventional water-cooling due to the growing difficulty in obtaining adequate water supplies and to the problem of thermal and biological pollution caused by the use of water. In typical air-cooled condensers, the fluid or vapor to be condensed is caused to flow through rows of finned heat exchange tubes with air being blown by blowers over the tubes and condensate collecting in a common manifold. As air flows between the rows sequentially, more vapour will condense in the first row of heat exchanger tubes than in subsequent rows and thus the condensing ability varies throughout the condenser. Further known air cooled condensers in addition to having a high cost and a large bulk, have a number of further disadvantages in that they cannot cope with variations in load.

It would be desirable therefore if an improved steam or vapour condensing system which was particularly applicable to radiant solar energy collecting apparatus was available.

SUMMARY OF THE INVENTION

The present invention provides in one preferred aspect, a steam or vapour condensing system for use with radiant solar energy collecting apparatus of the type having a solar energy concentrator and in which steam or vapour is generated for supply to a load and characterised in that said system uses said solar energy concentrator to directly or indirectly radiate heat energy of exhaust steam or vapour from said load.

Typically the load comprises a steam or vapour engine and the generated steam or vapour is used as the working fluid for the steam or vapour engine. The steam or vapour condensed in the condensing system comprises exhaust steam or vapour from the engine.

Suitably the steam or vapour is passed through a heat exchanger and heat energy extracted in use from the steam or vapour in the heat exchanger is directly or indirectly radiated by the concentrator.

In solar energy collecting apparatus of the type disclosed in my aforementioned International patent application No PCT/AU99/00140 in which the solar energy concentrator floats on a body of liquid such as water, the heat exchanger uses the body of liquid and heat exchange occurs between the exhaust steam or vapour and the body of liquid. The heat exchanger is thus in this embodiment indirectly associated with the concentrator. For effecting heat exchange as above, the exhaust steam or vapour may be passed or directed through one or more ducts of any configuration submerged in or in contact with the body of liquid. A suitable pump or pumps may be provided for pumping the exhaust steam or vapour through the duct or ducts or system pressure may cause the passage of exhaust steam or vapour through the duct or ducts.

Due to the cooling effect of the water in which the steam or vapour is in indirect contact through the duct or ducts, heat energy of the exhaust steam or vapour will be transferred to the body of liquid. The exhaust steam or vapour will thus be condensed and be converted into water or liquid. In addition, the body of liquid in which the solar concentrators float will be heated due to heat energy transference from the condensing steam or vapour. Heating of the body of liquid will continue during the day as steam or vapour is continued to be generated by the radiant energy collecting apparatus and supplied to the steam or vapour engine with exhaust steam or vapour from the engine passing through the body of liquid. As the body of liquid is heated, the solar concentrator or concentrators which are floating on the body of liquid are also heated by conduction and radiant energy will be emitted by the solar energy concentrators which will dissipate heat energy from the body of liquid and cause cooling thereof. This will therefore maintain the efficiency of the steam or vapour condensing system.

As referred to above, the duct or ducts located within the body of liquid may be in many different configurations and one embodiment may simply comprise a heat exchanger tube or tubes in the form of a coil or in other configurations which is submerged in the body of liquid. The duct or ducts for example may be in the form a coil or coils of serpentine configuration which is/are submerged in the body of liquid. The heat exchanger tubes may be located in any position in the reservoir but typically may extend circumferentially of the reservoir.

The solar energy concentrators in this embodiment typically comprise mirrors or other reflectors with mirror-like properties supported on a platform floating on the body of liquid. The mirrors or reflectors may be parabolic trough reflectors or Fresnel type reflectors in a parabolic configuration. The body of liquid may typically be contained in a reservoir such as a circular reservoir in which the radiant energy collecting apparatus is floating. The body of liquid however may be water in a river, ocean, bay or lake.

In another preferred arrangement the heat exchanger may comprise a separate condenser and liquid from the body of liquid in which the platform assembly is floating is used as a source of cooling fluid to cool and cause condensing of the exhaust steam or vapour. For this purpose a pump or pumps are provided to circulate liquid from the body of liquid through the condenser and return it to the body of liquid. System pressure or a suitable pump or pumps may be provided for pumping or circulating the steam or vapour through the condenser and return the condensed steam or vapour to the system. As heat energy is extracted from the steam or vapour flowing into the condenser and transferred to the liquid flowing into condenser from the body of liquid, the liquid is heated and thereby cause heating of the body of liquid to which it is returned. As above the heat energy will be radiated by the solar concentrator or concentrators which are floating on the body of liquid.

In another embodiment of the steam or vapour condensing system, the heat exchanger may comprise the solar energy concentrator/s. The heat exchanger further may include means mounted on or located in close proximity to the rear of the concentrator for conveyance of exhaust steam or vapour such that the concentrator is heated by steam or vapour with the heat being subsequently radiated from the concentrator/s to cool and thereby condense the steam or vapour. The means mounted on or in close proximity to the rear of the concentrator may comprise a duct or plurality of ducts for receiving said exhaust steam or vapour. The duct or ducts may be fixed to the rear of concentrator. The duct or ducts may be arranged in a coiled or serpentine configuration on the rear of the concentrator. Alternatively the means mounted on or in close proximity to the rear of the concentrator comprises a hollow jacket or chamber for receiving said exhaust steam or vapour. The hollow jacket or chamber may be provided on the rear of the concentrator or the concentrator may be incorporated into the hollow jacket or chamber.

The solar energy concentrators in this embodiment typically comprise mirrors or other reflectors with mirror-like properties. The reflectors may be of any configuration including flat mirrors, parabolic cylindrical mirrors of trough or dish like or mirrors arranged in a Fresnel configuration.

The duct or ducts and hollow jacket or chamber may also be used for carrying a coolant for cooling of the concentrators particularly where the concentrators are secondary concentrators.

The present invention in a further aspect provides a steam or vapour condensing method for use with radiant solar energy collecting apparatus of the type having a solar energy concentrator and in which steam or vapour is generated for supply to a load, said method including the steps of extracting heat energy from exhaust steam or vapour from said load and using said solar energy concentrator to directly or indirectly radiate heat energy extracted from said exhaust steam or vapour.

In one aspect, the method is applied to radiant solar energy collecting apparatus of the type which floats on a body of liquid and heat energy from the exhaust steam or vapour is transferred to the body of liquid for radiation by the solar energy concentrator.

In another aspect, heat energy from the exhaust steam or vapour is transferred directly to the concentrator for radiation thereby.

In yet another aspect, the present invention provides radiant solar energy collecting apparatus of the type having a solar energy concentrator and in which steam or vapour is generated for supply to a load and characterised in that the solar energy concentrator is adapted to directly or indirectly radiate heat energy of exhaust steam or vapour from said load.

The apparatus may also include a heat exchanger for receipt of the exhaust steam or vapour and the heat energy extracted in use from the exhaust steam or vapour in the heat exchanger is directly or indirectly radiated by the concentrator. Suitably, the solar energy concentrator floats on a body of liquid and heat energy of the exhaust steam or vapour is transferred to the body of liquid. The apparatus suitably includes a duct for receipt of the exhaust steam or vapour, the duct being submerged or in contact with the body of liquid such that heat energy in the exhaust steam or vapour can be transferred in use to said body of liquid. In another embodiment, the heat exchanger comprises a separate condenser for receiving the exhaust steam or vapour and means are provided for circulating liquid from said body of liquid through the condenser for condensing the steam or vapour within the condenser. Heat energy transferred to the body of liquid from the exhaust steam or vapour is then radiated by the concentrator.

In another embodiment, the heat exchanger comprises passage means mounted on or located in close proximity to the rear of the concentrator for passage of exhaust steam or vapour for radiation of heat energy by the concentrator or for the passage of a coolant for cooling the concentrator. The passage means may comprise a duct or ducts or a hollow jacket or chamber.

The present invention in a further preferred aspect provides energy generating apparatus comprising radiant solar energy collecting apparatus including a solar energy concentrator for generating and/or heating steam or vapour, said solar energy concentrator being arranged to float on a body of liquid, a steam or vapour turbine or engine for receiving said generated and/or heated steam or vapour, said turbine or engine being adapted to drive a load, and heat exchanger means for transferring heat of exhaust steam or vapour from said turbine or engine to said body of liquid for at least partially condensing exhaust steam or vapour from said turbine or engine.

Preferably the heat exchanger means comprises a duct or ducts submerged within the body of liquid for conveying the exhaust steam or vapour through the body of liquid to effect heat exchange therebetween. Means may be provided to supply feed liquid derived from the condensed steam or vapour back to the apparatus for reuse as the working fluid. The solar concentrator may be supported on or include a buoyant body or platform for floating on the body of liquid.

Alternatively, the heat exchanger means comprises a separate steam or vapour condenser and means such as a pump may be provided for circulating liquid or water from the body of liquid through the condenser to cause condensation of the exhaust steam or vapour which is supplied or passed through a condenser. Thus heat energy of the steam or vapour will be transferred to the circulating liquid which when returned to the body of liquid causes heating thereof. The heat energy in the heated body of liquid is thus again radiated by the concentrator so that the body of liquid is cooled.

The present invention in yet a further preferred aspect provides energy generating apparatus comprising radiant solar energy collecting apparatus including a solar energy concentrator for generating and/or heating steam or vapour, a steam or vapour turbine or engine for receiving said generated or heated steam or vapour for driving an energy generator, and said concentrator being adapted to radiate heat of exhaust steam or vapour from said turbine or engine for at least partially condensing said exhaust steam or vapour from said steam turbine or engine.

BRIEF DESCRIPTION OF THE DRAWINGS

To enable the invention to be more fully understood and put into practical effect, reference will now be made to the accompanying drawings which illustrate preferred embodiments of the invention and wherein.

DETAILED DESCRIPTION OF THE PREFERRED EMBODIMENTS

Figure 1:
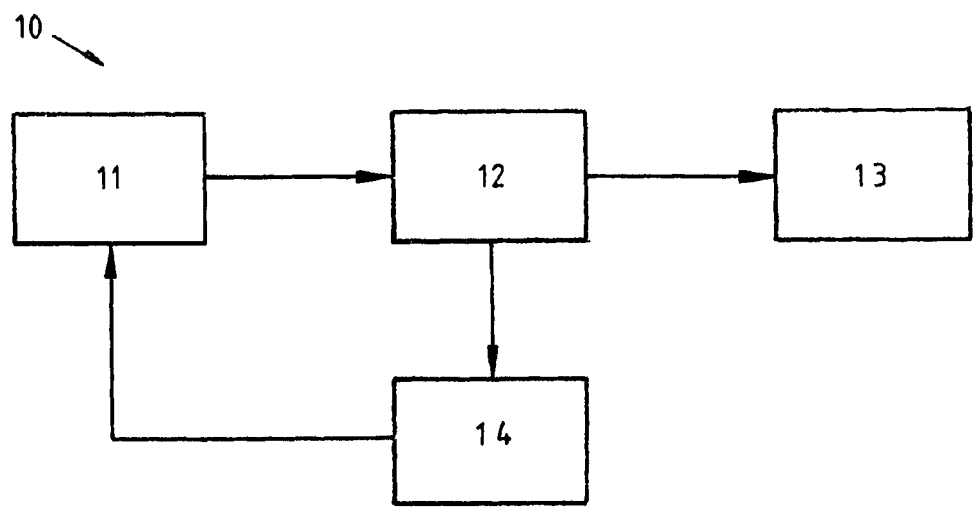
FIG. 1 illustrates in block diagram form energy generating apparatus incorporating a condensing system according to a first embodiment of the present invention.
Figure 2:
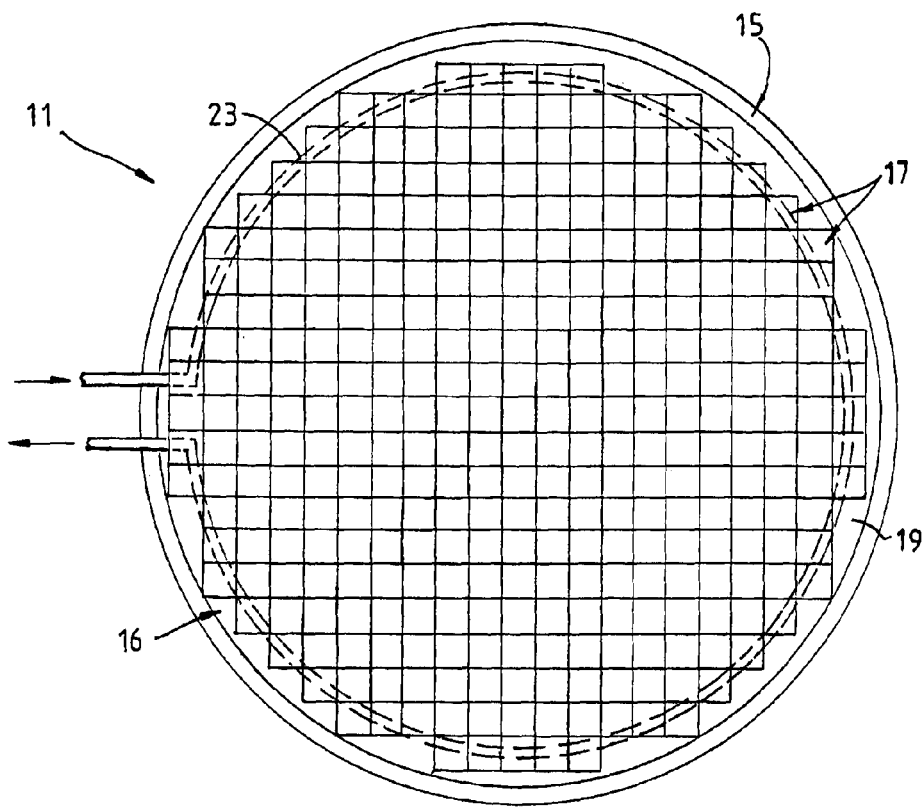
FIGS. 2 and 3 illustrate schematically in plan and side views radiant solar energy collecting apparatus for use in generating steam for the energy generation apparatus of FIG. 1 and incorporating a steam condenser.
Figure 3:
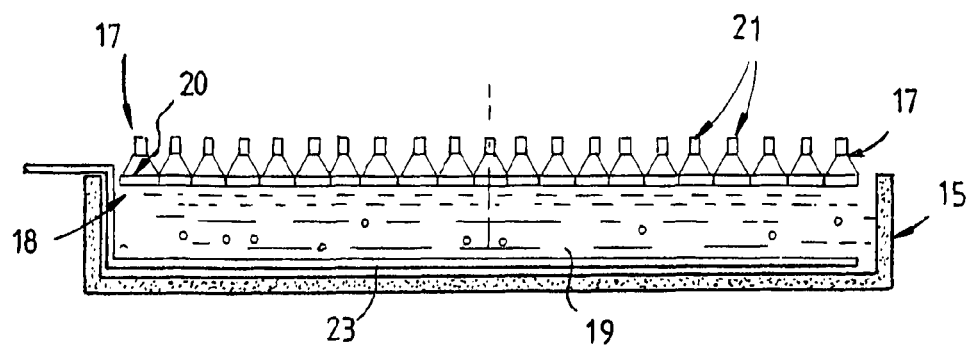

Referring to the drawings and firstly to FIG. 1 there is illustrated in block diagram form, energy generating apparatus 10 according to an embodiment of the present invention, the apparatus including a solar thermal steam generator 11 which supplies steam to a steam turbine 12 which drives an electrical generator 13 for generating power. Exhaust steam from the steam turbine 12 is condensed in a condenser 14 with condensate water from the condenser being supplied back to the steam generator 11 for re-use as the working fluid to be converted into steam. The solar thermal steam generator 11 is typically of the type disclosed in my International patent application No PCT/AU99/00140 which includes as shown in FIGS. 2 and 3 a circular reservoir 15 which contains water and on which the steam generator 11 floats. In accordance with an embodiment of the invention, the condenser 14 is associated with the reservoir 15 as described further below.

Figure 4:
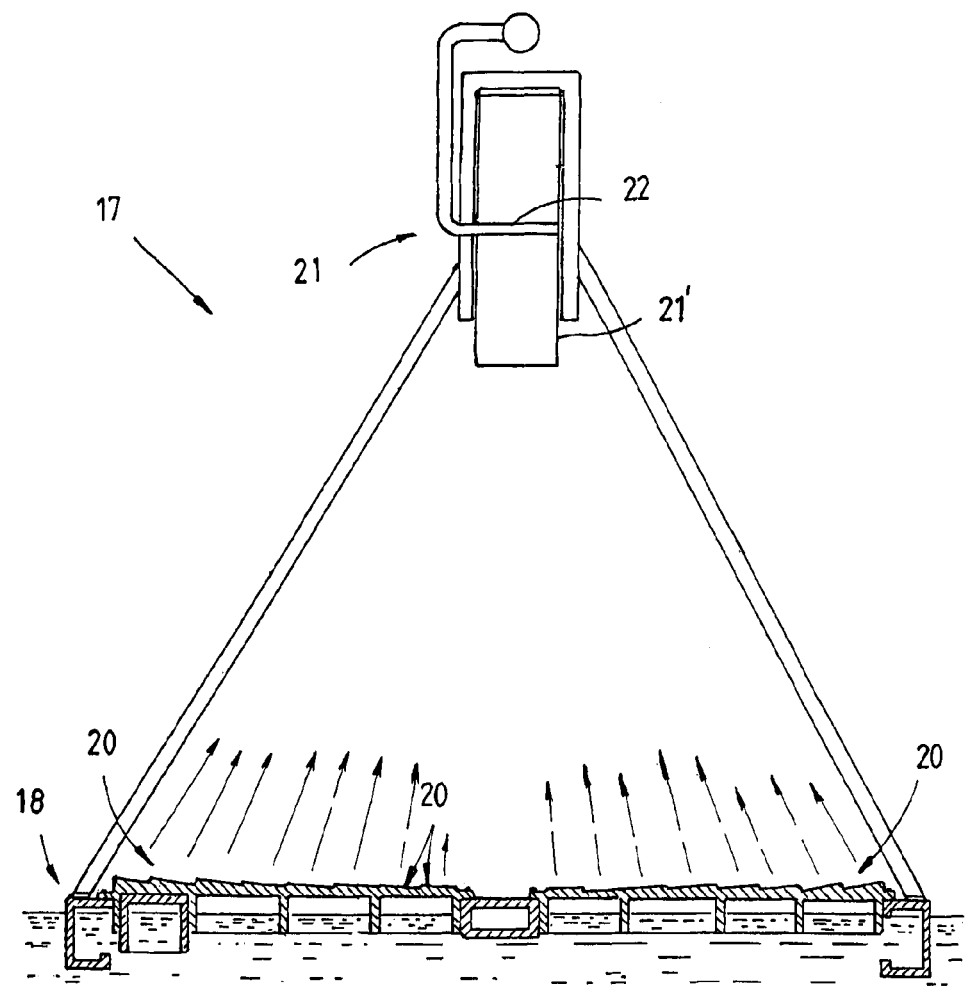
FIG. 4 is an enlarged side elevational view of a solar collecting and concentrating assembly of the solar energy collecting apparatus of FIGS. 2 and 3.

The solar steam generator 11 includes as shown in FIGS. 2 to 4, an array 16 of solar collecting and concentrating assemblies 17, each assembly 17 including a rectangular buoyant platform 18 which is capable of floating on the body of liquid or water 19 contained in the reservoir 15. The solar collecting assemblies 17 have their platforms 18 interconnected to form the array 16 of a generally circular configuration to substantially occupy the surface area of the reservoir 15 with the body of liquid or other liquid 19 acting as a bearing so that the array 16 may be rotated about a vertical axis at the centre of the array 16 to track movement of the sun.

In each individual solar collecting assembly 17, the platform 18 supports on its top surface reflectors 20, typically mirrors in a Fresnel configuration which form a composite cylindrical parabolic concentrator to concentrate solar energy onto or towards a target 21 supported above each platform 18, the target 21 comprising in this embodiment a secondary concentrating assembly typically including a parabolic cylindrical reflector 21' which concentrates energy on an energy collecting element 22 arranged at the focus of the reflector 21'. The element 22 typically comprises a tubular member through which water, steam or other working fluid flows, the fluid being converted into steam or superheated steam for supply to the steam turbine 12.

The condenser 14 for condensing exhaust steam from the turbine 12 comprises a heat exchange duct or ducts 23 for example of tubular form which may be arranged in a coil or coils or in any other configuration submerged within the liquid 19 in the reservoir 15. Typically and, as shown in FIG. 2, the coiled duct 23 may extend in a generally circumferential direction within the reservoir 15.

In use and during the day, the reflectors 20 concentrate solar energy from the sun on the secondary concentrating assemblies or targets 21 which further concentrate the solar energy on the energy collecting elements 22 through which water and/or steam is passing to create superheated steam for supply to the turbine 12 to drive the generator 13. Exhaust steam from the turbine 12 is supplied to the heat exchanger duct or ducts 23 within the reservoir 15 in which heat exchange occurs between the steam flowing in the heat exchanger duct or ducts 23 and the colder water 19 within the reservoir 15 which causes condensation of the steam into water. Thus during the day, the water 19 in the reservoir 15 heats up provided exhaust steam is still supplied to the heat exchanger duct or ducts 23. Condensed water from the heat exchanger duct or ducts 23 is supplied back as feed water to the steam generator 11 for conversion again into steam and superheated steam.

The reflectors 20 of the solar collecting assemblies 17 act as infra red radiators and radiate heat energy from the heated water 19 within the reservoir 15 both in the absence of sun and in the presence of sun. Thus the water 19 in the reservoir 15 will be cooled such that when steam is generated or again generated in the system 10 for example the next day, the cooled water 19 in the reservoir 15 will ensure efficient condensation of steam flowing through the heat exchanger duct or ducts 23. It will be appreciated that the condenser duct or ducts 23 may be of many different configurations as may the reservoir 15. Further the solar collecting assemblies 17 may be located in any other body of liquid or fluid.

Figure 5:
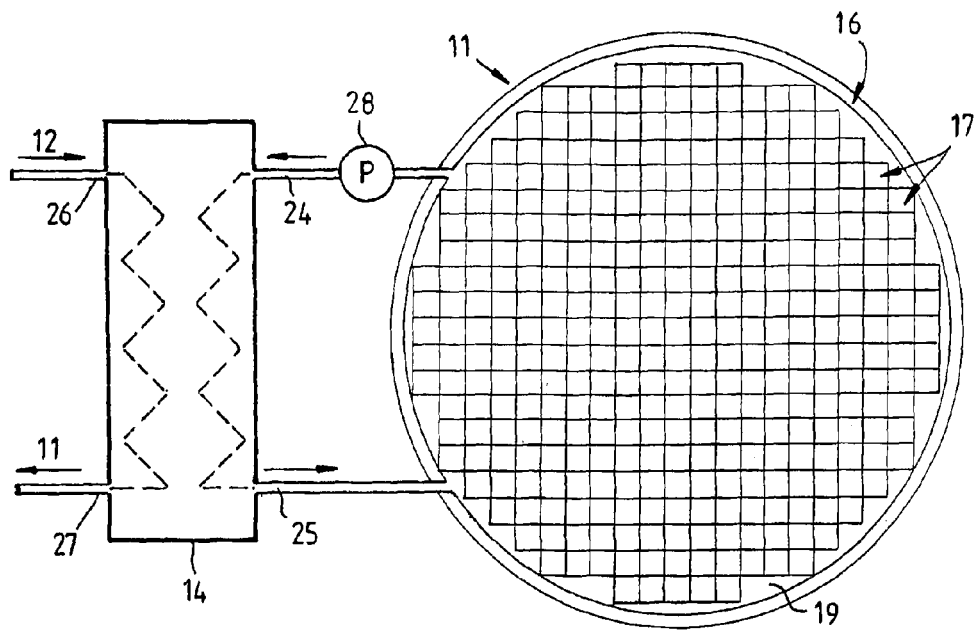
FIG. 5 illustrates schematically an alternative steam or vapour condensing system according to another embodiment of the invention.

FIG. 5 illustrates schematically an alternative condensing system for steam or vapour for use with the solar steam generator 11 which employs a conventional condenser 14 having an inlet and outlet 24 and 25 respectively for a coolant and inlet 26 for steam and outlet 27 for condensate typically water. The coolant in this case comprises liquid or water from the body of liquid 19 contained within the reservoir 15 with the inlet 24 being connected to the reservoir 15 via a pump 28 and the outlet 25 being connected back to the reservoir 15.

In use exhaust steam from the turbine 12 is supplied to the condenser 14 through the steam inlet 26 and water from the reservoir 15 is circulated via the pump 28 through the condenser 14. The heat exchange between the steam and water flowing into the condenser 14 will cause the steam to condense and heat to be transferred from the steam to the water circulating in the condenser 14 and the heated water is returned to the reservoir 15 via the outlet 25. Thus during the day when steam is being generated, the steam will be condensed within the condenser 14 and water 19 in the reservoir 15 will be heated up. The steam condensate exiting the condenser 14 through the exit 27 is supplied back as feed water to the steam generator 11 for conversion again into steam and superheated steam. The heat energy within the heated water 19 within the reservoir 15 will be radiated outwardly by the reflectors 20 both at night and during the day to thereby cool the water 19 in the reservoir 15 to maintain its efficiency as a cooling fluid for supply to the condenser 14 to condense supplied steam.

Figure 6A:
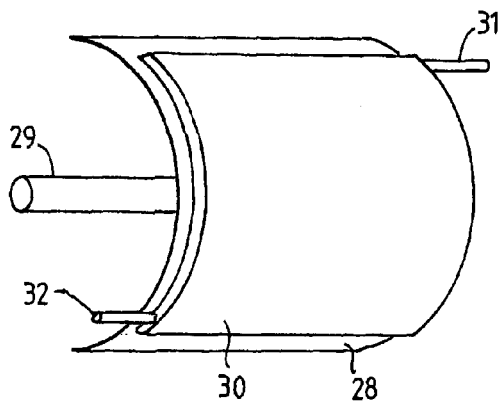
FIGS. 6A and 6B are rear and side views of a solar concentrator incorporating a heat exchanger for an alternative radiant solar energy collecting apparatus.
Figure 6B:
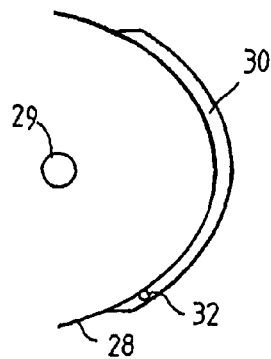

The present invention may also be applied to other forms of solar energy collecting apparatus such as apparatus mounted on the land which include a parabolic cylindrical primary concentrators 28 for example as shown in FIGS. 6A and 6B which concentrate solar energy on a target comprising a hollow energy collecting element 29 through which a heat transfer fluid such as steam or water flows. The concentrators 28 have reflective mirror surfaces on their operative faces or may be formed of a reflective material such as of polished aluminium or other metal and the collecting elements 29 extend substantially along the focus lines of the concentrators 28. Steam or superheated steam produced in the element 29 may be supplied to a steam turbine 12 as in FIG. 1 to drive an electrical generator 13.

In this embodiment, the concentrator 28 is provided on its rear side with a hollow chamber 30 which defines a water jacket which is provided with an inlet 31 and an outlet 32, the chamber 30 being fixed to the rear of, or formed integrally with the concentrator 28. Steam exiting the turbine 12 is supplied to the inlet 31 to the chamber 30 and thus the chamber 30 and concentrator 28 are heated. The heat energy however is radiated by the concentrator 28 which will act as an infra-red radiator and radiate heat energy to thereby cool the chamber 30 to assist in condensing the steam with condensate exiting through the outlet 32. The steam may be passed in series through a number of chambers 30 associated with respective concentrators 28 to ensure full condensation of the steam which may then be reused for example as the working fluid to be heated in the absorber tube 29 associated with the concentrator 28.

The chambers 30 may also be used for cooling the parabolic concentrator 28 for example where the concentrator comprises a secondary concentrator as in the concentrator 21' in the embodiment of FIG. 4. In such an application, each concentrator 28 receives concentrated solar energy from the primary reflectors 20 and absorbs a proportion of the concentrated solar energy and therefore tends to heat up. To reduce heating of a concentrator 28, a coolant such as water may be supplied to the chamber 30 to flow from the inlet 31 to the outlet 32 of the chamber 30 and extract heat energy from the concentrator 28 to cool the concentrator 28 and prevent or minmise the risk of damage thereto, for example discolouring or cracking where the concentrators 28 are glass.

Figure 7A:
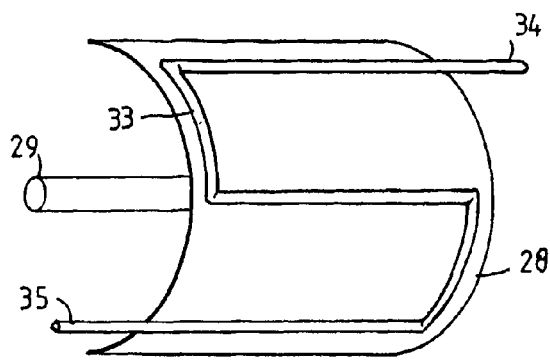
FIGS. 7A and 7B are rear and side views an alternative solar concentrator incorporating a heat exchanger for another radiant solar energy collecting apparatus.
Figure 7B:
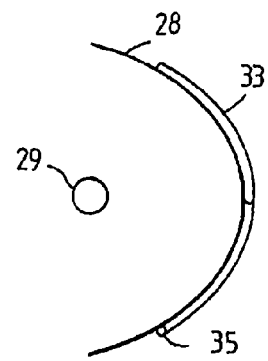

In the embodiment of FIGS. 7A and 7B, the parabolic concentrator 28 instead of being provided with a chamber 30 includes a duct 33 which has an inlet 34 for steam and an outlet 35 for condensate, the duct 33 being arranged in a serpentine manner on the rear side of the concentrator 28 and fixed to the concentrator 28 preferably by a suitable fastening arrangement eg. by welding or brazing which will ensure heat transference between the concentrator 28 and duct 33. As above, steam exiting the steam turbine passes into the Inlet 34 for flow through the serpentine duct 33 to the outlet 35. The heat energy of the steam in the duct 33 is dissipated by radiation by the concentrators such as to condense the steam into water which exits the outlet 35 for reuse.

As in the embodiment of FIGS. 6A and 6B, where the concentrator 28 of FIGS. 7A and 7B is used as a secondary concentrator for example in place of the secondary concentrator 21' of FIG. 4, a coolant such as water may be supplied to the duct 33 to flow from the inlet 34 to the outlet 35 and extract heat from the concentrator 28.

It will be appreciated that the concentrators or reflectors 28 may be in many different configurations including the parabolic form illustrated, in the form of a parabolic dish, in the form of flat or planar mirrors or reflectors or in any other configuration. In addition, the chamber 30 may be in many different configurations and may be formed as part of the concentrator 28. Similarly the duct 33 may be in any form and for example comprise a series of interconnected tubes on the rear of the concentrator 28.

It will be further appreciated that the system described with reference to FIGS. 1 to 5 may be used in association with any form of steam generation apparatus including any form of solar energy collecting apparatus which floats on a body of liquid.

The reference to prior art herein including reference to prior patent applications is not to be taken as an admission that such prior art constitutes common general knowledge in the art.

The terms "comprising" or "comprises" as used throughout the specification are taken to specify the presence of the stated features, integers and components referred to but not preclude the presence or addition of one or more other feature/s, integer/s, components or group thereof.

Whilst the above has been given by way of illustrative embodiment of the invention, all such variations and modifications thereto as would be apparent to persons skilled in the art are deemed to fall within the broad scope and ambit of the invention as defined in the appended claims.

The invention claimed is:

1. A steam or vapour condensing system in combination with radiant solar energy collecting apparatus of the type having a solar energy concentrator which floats on a body of liquid, said body of liquid being contained within a circular liquid reservoir and said solar energy concentrator comprising an array of solar energy collecting and concentrating assemblies, each having a buoyant platform, said buoyant platforms being interconnected such that said array of platforms are in a generally circular configuration to substantially occupy the surface area of said reservoir, said solar energy concentrator being adapted to generate steam or vapour for supply to a load, said condensing system including a heat exchanger for receiving exhaust steam or vapour from said load and extracting heat energy therefrom, said heat exchanger including said body of liquid within said reservoir whereby heat exchange occurs between said exhaust steam or vapour and said body of liquid which causes heating of said body of liquid and cooling and condensing of said exhaust steam or vapour and wherein heat energy in said body of liquid is conducted to said solar energy concentrator and wherein said solar energy concentrator radiates said heat energy to cause cooling of said body of liquid.

2. A steam or vapour condensing system as claimed in claim 1 wherein said heat exchanger comprises a duct for receipt of said exhaust steam or vapour, said duct being submerged in or in contact with the body of liquid within said reservoir such that heat energy in the steam or vapour can be transferred in use to said body of liquid.

3. A steam or vapour condensing system as claimed in claim 1 wherein said heat exchanger comprises a condenser externally of said reservoir for receiving said exhaust steam or vapour and a pump or pumps for circulating liquid from said body of liquid through said condenser for condensing said steam or vapour within said condenser and absorbing heat energy of said steam or vapour wherein said absorbed heat energy is transferred to said body of liquid from said steam or vapour for radiation by said concentrator.

4. Radiant solar energy collecting apparatus for generating steam or vapour for supply to a load, said solar enemy collecting apparatus having a solar energy concentrator which floats on a body of liquid contained within a circular liquid reservoir, said solar energy concentrator comprising an array of solar energy collecting and concentrating assemblies, each having a buoyant platform, said buoyant platforms being interconnected such that said array of platforms are in a generally circular configuration and substantially occupy the surface area of said reservoir and wherein a heat exchanger for receipt of exhaust steam or vapour from said load, said heat exchanger including said body of liquid whereby heat exchange occurs between said exhaust steam or vapour and said body of liquid such that heat energy from the exhaust steam or vapour is transferred to said body of liquid and said steam or vapour is condensed, wherein said heat energy transferred to said body of liquid is conducted to said concentrator and radiated thereby to effect cooling of said body of liquid.

5. Apparatus as claimed in claim 4 wherein said heat exchanger includes a duct for receipt of said exhaust steam or vapour, said duct being submerged in or in contact with the body of liquid such that the heat energy in the steam or vapour can be transferred in use to said body of liquid within said reservoir.

6. Apparatus as claimed in claim 4 wherein said heat exchanger comprises a condenser externally of said reservoir for receiving said exhaust steam or vapour and a pump or pumps for circulating liquid from said body of liquid through said condenser for condensing said steam or vapour within said condenser and wherein heat energy is transferred to said body of liquid from said exhaust steam or vapour for radiation by said concentrator.

7. Energy generating apparatus comprising radiant solar energy collecting apparatus including a solar energy concentrator for generating and/or heating steam or vapour, said solar energy concentrator being arranged to float on a body of liquid in a circular liquid reservoir, said solar energy concentrator comprising an array of solar energy collecting and concentrating assemblies, each having a buoyant platform, said buoyant platforms being interconnected such that said array of platforms are in a generally circular configuration and to substantially occupy the surface area of said reservoir, a steam or vapour turbine or engine for receiving said generated or heated steam or vapour for driving an energy generator, a duct or ducts submerged within said body of liquid for transferring the heat energy of exhaust steam or vapour from said steam or vapour turbine to said body of liquid whereby said body of liquid is heated and said exhaust steam or vapour is condensed, said concentrator being adapted to receive by conduction the heat of exhaust steam or vapour transferred from said turbine or engine to said body of liquid and radiate said heat energy for cooling of said body of liquid.

8. Energy generating apparatus as claimed in claim 7 wherein said duct or ducts are connected to said steam or vapour turbine for conveying said exhaust steam of vapour through said body of liquid and a pump or pumps for pumping said exhaust steam or vapour through said duct or ducts to enable heat exchange between said exhaust steam or vapour and said body of liquid.

9. Energy generating apparatus as claimed in claim 7 and including a condenser having a first inlet connected to said steam or vapour turbine for receiving exhaust steam or gas therefrom, a first outlet for returning condensate to said steam or vapour turbine, and a second inlet and outlet, said duct or ducts being connected to said second inlet and outlet and a pump or pumps for circulating liquid from said body of liquid through said duct or ducts and via said second inlet and outlet through said condenser to effect heat exchange between said exhaust steam or vapour and said body of liquid to enable condensing of said exhaust steam or vapour and heating of said body of liquid.

10. The combination of claim 2 wherein said duct extends in a generally circumferential direction in said reservoir.

11. Energy generating apparatus as claimed in claim 8 wherein said duct or ducts extend in a generally circumferential direction in said reservoir.

12. Apparatus as claimed in claim 5 wherein said duct extends in a generally circumferential direction in said reservoir.

* * * * *

UNITED STATES PATENT AND TRADEMARK OFFICE
CERTIFICATE OF CORRECTION

PATENT NO. : 9,512,827 B2  
APPLICATION NO. : 14/241162  
DATED : December 6, 2016  
INVENTOR(S) : Allan James Yeomans Page 1 of 1

It is certified that error appears in the above-identified patent and that said Letters Patent is hereby corrected as shown below:

In the Claims

Claim 4, (Column 9, Line 46), delete "enemy" and substitute therefor "energy".

Signed and Sealed this  
Second Day of April, 2019

Andrei Iancu  
*Director of the United States Patent and Trademark Office*